United States Patent
Gordon et al.

(10) Patent No.: US 6,647,696 B2
(45) Date of Patent: Nov. 18, 2003

(54) OPEN CUP LID PACKAGING DEVICE FOR DISC-SHAPED MEDIA AND RELATED MATERIALS AND METHOD FOR PACKAGING SUCH DISCS AND MATERIAL

(75) Inventors: Alexandra Gordon, Bedford, NY (US); Charles W. Grimes, Darien, CT (US); William L. Plumb, Piermont, NY (US)

(73) Assignee: Avecmedia Inc., Norwalk, CT (US)

( * ) Notice: Subject to any disclaimer, the term of this patent is extended or adjusted under 35 U.S.C. 154(b) by 6 days.

(21) Appl. No.: 10/154,317

(22) Filed: May 22, 2002

(65) Prior Publication Data

US 2002/0175093 A1 Nov. 28, 2002

Related U.S. Application Data

(60) Continuation-in-part of application No. 09/950,732, filed on Sep. 12, 2001, now Pat. No. 6,464,072, which is a division of application No. 09/702,266, filed on Oct. 31, 2000, now Pat. No. 6,533,114, which is a division of application No. 09/161,064, filed on Sep. 25, 1998, now Pat. No. 6,216,857.

(51) Int. Cl.[7] ............................................. B65D 85/57
(52) U.S. Cl. .......................... 53/410; 53/471; 206/217; 206/232; 206/308.1; 215/227; 215/229; 220/521
(58) Field of Search ................... 53/410, 471; 206/217, 206/232, 307, 308.1, 308.3, 309–311; 215/6, 227, 229; 220/212, 521, 522, 705, 709, 710

(56) References Cited

U.S. PATENT DOCUMENTS 1,464,827 A * 8/1923 Morrison .................... 206/216
1,940,088 A * 12/1933 Harrison ..................... 206/408
2,015,028 A * 9/1935 Gillette ......................... 40/307
2,020,381 A * 11/1935 Labowitz et al. ........... 206/216
3,746,158 A * 7/1973 Connick ...................... 426/120
4,535,888 A * 8/1985 Nusselder .................... 206/311
4,869,364 A * 9/1989 Bray ............................ 206/232
5,180,079 A * 1/1993 Jeng ............................. 220/705

(List continued on next page.)

*Primary Examiner*—Jim Foster
(74) *Attorney, Agent, or Firm*—Grimes & Battersby LLP

(57) ABSTRACT

An elongated packaging device is provided for packaging at least one disc-shaped media such as a CD-ROM or DVD, together with a cup-type beverage container of the kind typically having a cover with a central straw opening. The packaging device includes a cylindrical lid adapted to receive and retain a disc-shaped media, which cylindrical lid is then engaged to the beverage container. The lid includes a cylindrical support structure disposed on the upper surface thereof defining central support for the disc media by means of the annular opening at the center of the disc, such that the disc media is allowed to rotate, while limiting the linear movement of the disc media. The cylindrical support structure includes an opening so as to allow the passage therethrough of a straw. The lid also includes an annular shelf around the perimeter thereof, the inside diameter of which is larger than the outside diameter of the disc media, and the peak of which is coplanar with the peak of the inner structure. A sealing member is heat-sealed to the shelf and the inner structure, after the disc is inserted so as to seal it within a dry, air-tight chamber, thereby preventing any beverage from coming in contact with the disc media. The center of the sealing member, which center is situated adjacent to the opening in the inner structure, includes a means to penetrate the sealing member while maintaining the integrity of the air-tight chamber storing the disc media. The cylindrical lid is attached to the beverage container by means of a compression fit.

27 Claims, 13 Drawing Sheets

U.S. PATENT DOCUMENTS

| | | | | |
|---|---|---|---|---|
| 5,284,243 A | * | 2/1994 | Gelardi et al. | 206/308.1 |
| 5,513,762 A | * | 5/1996 | Janani | 215/229 |
| 5,542,531 A | * | 8/1996 | Yeung | 206/308.1 |
| 5,697,498 A | * | 12/1997 | Weisburn et al. | 206/308.1 |
| 5,816,394 A | * | 10/1998 | O'Brien et al. | 206/308.1 |
| 5,819,929 A | * | 10/1998 | Chung | 206/308.1 |
| 5,904,266 A | * | 5/1999 | Tedeschi, Jr. | 220/521 |
| 5,906,290 A | * | 5/1999 | Haberkorn | 220/505 |
| 6,070,752 A | * | 6/2000 | Nava et al. | 220/521 |
| 6,112,891 A | * | 9/2000 | Wohl et al. | 206/223 |
| 6,196,411 B1 | * | 3/2001 | Nava et al. | 220/521 |
| 6,349,823 B1 | * | 2/2002 | Innis | 206/308.1 |
| 6,454,087 B2 | * | 9/2002 | Gordon et al. | 206/217 |
| 6,557,698 B2 | * | 5/2003 | Gordon et al. | 206/217 |

* cited by examiner

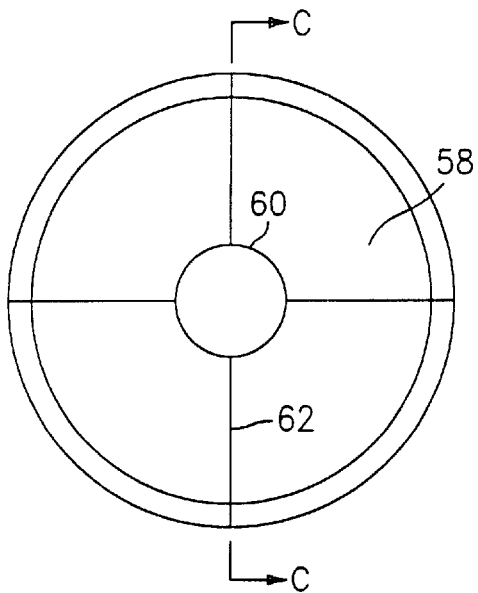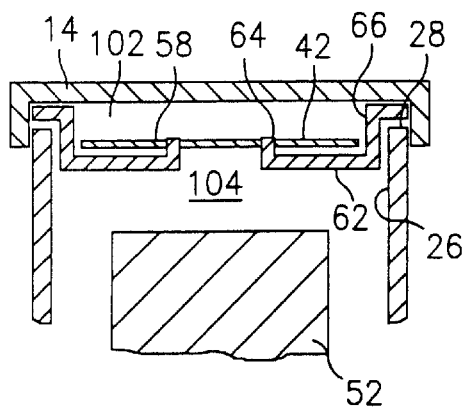
FIG. 4        FIG. 4A
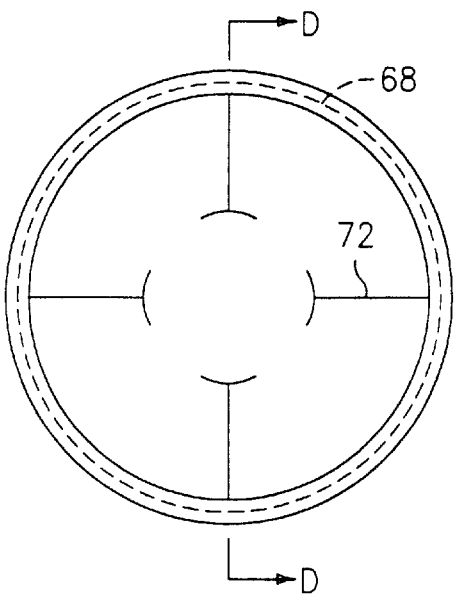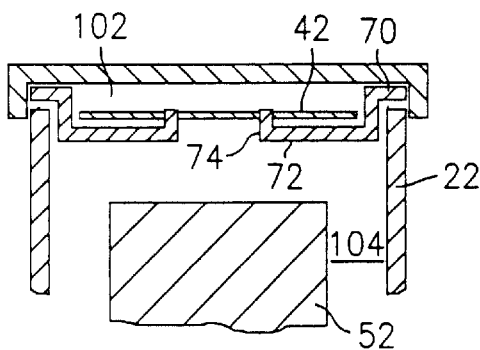
FIG. 5        FIG. 5A

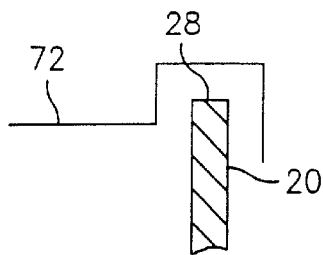
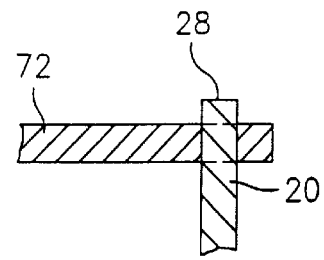
*FIG. 6A*                *FIG. 6B*
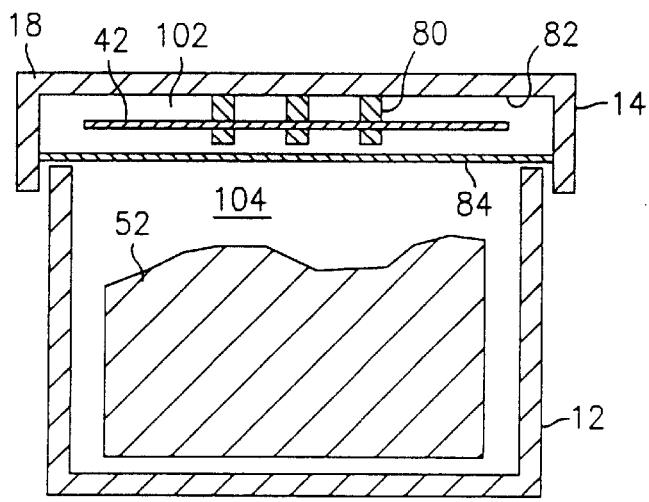
*FIG. 7*
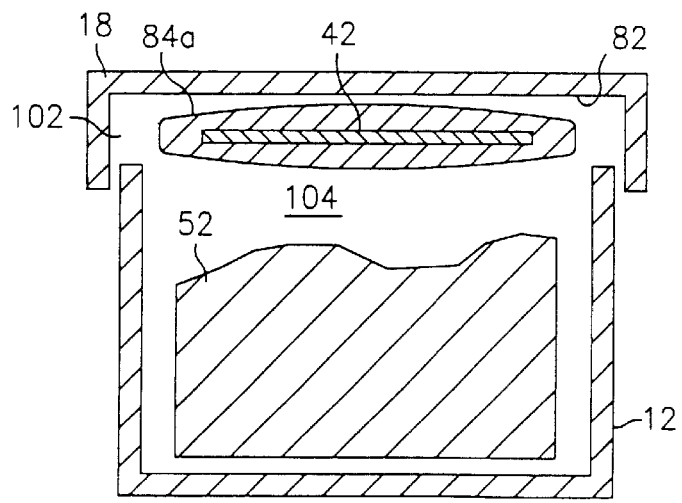
*FIG. 7A*

OPEN CUP LID PACKAGING DEVICE FOR DISC-SHAPED MEDIA AND RELATED MATERIALS AND METHOD FOR PACKAGING SUCH DISCS AND MATERIAL

RELATED APPLICATIONS

This is a continuation-in-part of copending application(s) Ser. No. 09/950,732 filed on Sep. 12, 2001 in the names of Alexandra Gordon and Charles W. Grimes for "Packaging Device for Disc-Shaped media and Related Materials and Method for Packaging Such Disks and Material,", U.S. Pat. No. 6,464,072, which was a divisional of U.S. patent application Ser. No. 09/702,266 filed on Oct. 31, 2000 in the names of Alexandra Gordon and Charles W. Grimes for "Packaging Device for Disc-Shaped media and Related Materials and Method for Packaging Such Disks and Material", U.S. Pat. No. 6,533,114, which, in turn, was a divisional of then co-pending U.S. patent application Ser. No. 09/161,064 filed on Sep. 25, 1998 in the names of Alexandra Gordon and Charles W. Grimes for "Packaging Device for Disc-Shaped media and Related Materials and Method for Packaging Such Disks and Material" which subsequently issued on Apr. 17, 2001 as U.S. Pat. No. 6,216,857.

BACKGROUND OF THE INVENTION

1. Field of the Invention

This invention relates, in general, to a device for packaging and displaying a circular or disc-shaped media having a central hole therein and other materials, and a method for packaging such disc-shaped media and other materials.

More particularly, the present invention relates to a new and improved container for packaging and storing of disc-shaped media and other materials in stacked relationship, having a first chamber and a second chamber stacked on top of one another for respectively receiving and securely retaining the disc media and the other materials.

Still more particularly, the present invention relates to a new and improved method for packaging and storing a disc-shaped media and a beverage in stacked relationship, wherein in a preferred embodiment the beverage is placed inside an open ended first container or cup and the media is releasably retained within a cup lid such that the media is permitted to move rotationally, while being limited in linear movement both perpendicularly and parallel to the plane of the media. A seal is applied to the top of the cup lid to prevent any beverage from contacting the disc-shaped media. The cup lid is then releasably attached to the first container or cup such that the cup lid serves to seal the open end of the first container or cup.

2. Background of the Invention

Packaging and storage devices for media are generally known. Disc-shaped media, such as CD's, DVD's or CD-ROM's, encounter special problems in handling, packaging and storage due to their delicate, flat recorded surfaces. Such disc media is generally sold in plastic cases which are sometimes referred to as "jewel boxes." Such cases are generally rectangular and have a mounting hub for holding the disc media by its center aperture. Such cases are usually kept after purchase of the disc media and utilized for re-packaging of the disc media between usage. Such jewel boxes are impractical packaging containers for shipping because of their small dimensions and easy breakage, and they thus require substantial additional packaging material or placement in larger shipping containers.

Disc media is routinely sold with other materials (whether directly related to the content of the disc media, i.e., ancillary, or otherwise). At the present time, disc media in such "jewel boxes" is commonly packaged together with ancillary materials in larger rectangular shaped cardboard boxes for shipping, sale and packaging. The "jewel boxes" are necessary to reliably protect the disc media from contact with the ancillary materials in the larger cardboard boxes. Such plastic case/cardboard box combination package arrangements are not only expensive, they also do not lend themselves to easy and secure storage of the disc media and ancillary materials, particularly when such ancillary materials take the form of a beverage.

Other types of packaging and storage devices are needed to organize, protect, ship, display at retail and store disc media sold and/or shipped in combination with beverages sold in a cup-type container.

An opportunity exists that is not being commercially exploited at the present time to distribute disc-shaped recording media with beverages dispensed in cup-type containers of the type typically sold in theaters and stadiums. This opportunity is not being exploited due to the lack of an effective container design and method for efficiently organizing, protecting, shipping, displaying at retail and storing disc-shaped media packaged with other materials.

SUMMARY OF THE INVENTION

A primary object of this invention is to provide a container in which and a method whereby disc-shaped media and liquid refreshment materials can be packaged together in stacked relationship in a manner so as to avoid contact there between.

Another object of this invention is to provide a container and a method of packaging that enables the delivery of disc-shaped media at the point of retail delivery of beverages and other liquid refreshments in a fun, innovative and eye-catching manner.

Still another object of this invention is to provide a container and a method of packaging that enables disc-shaped media to be securely packaged remotely from the point of retail delivery with beverage or other liquid refreshments.

Yet another object of this invention is to provide a container and a method of packaging that eliminates the need for a separate case (i.e., the need for a "jewel box") for the disc media.

Another object of this invention is to provide a container and a method of packaging whereby during initial storage, shipping, retail presentation and re-packaging the disc media is securely held against linear movement and protected, while simultaneously being allowed to rotate freely.

Yet still another important object of this invention is to provide a shipping container in which and a method of shipping whereby disc-shaped media and beverages can be packaged, presented, conveyed, distributed and stored.

Another important object of this invention is to provide an aesthetically unique and compelling device and method for presenting at retail disc-shaped media and beverages.

Still another object of this invention is to provide a container and a method of packaging that is sealed so as to prevent any of the liquid refreshment stored within the container from coming into contact with the disc media.

To accomplish these and other objects, the container of this invention in its preferred form is a cylindrical lid adapted to receive and retain a disc-shaped media, which cylindrical lid is then fitted onto a beverage container of the type typically constructed of plastic or paper which is often sold or given away as a promotional item in connection with the purchase of a large fountain beverage. The lid has an upper surface and a lower surface and includes a cylindrical support structure disposed upon said upper surface, said support structure defining central support for the disc media by means of the hole at the center of the disc, such that the disc media is allowed to rotate, while limiting the linear movement of the disc media both perpendicular to and parallel to the plane of the media. The support structure is tubular in construction and includes an opening so as to allow the passage therethrough of a straw. Disposed about the outer perimeter of the upper surface of the lid is a raised rim having a diameter larger than that of the disc media. The peak of the support structure and the raised rim are co-planar and rise above the upper surface of the lid a distance greater than the thickness of the disc to thereby create a cavity for the storage of said disc. Once the disc media has been inserted within said lid about said inner structure, a sealing member is applied, which sealing member is sealed to the rim and the inner structure about the peaks of such members, so as to seal the disc media within a dry, airtight chamber, thereby preventing any beverage from coming in contact with the disc media. The center of the sealing member, which center is situated adjacent to the opening in the inner structure, includes a means to penetrate the sealing member while maintaining the integrity of the air-tight chamber storing the disc media, i.e., the integrity of the seal between the sealing member and the inner structure is not corrupted by insertion of the straw. In the preferred embodiment, this means to penetrate comprises an "X" shaped incision, commonly referred to as a "kiss cut". By forcibly inserting a straw through said opening in said inner structure, the straw will penetrate the kiss cut, thereby allowing access to the beverage in the container, without breaking the seal between the sealing member and the inner structure. The cylindrical lid is attached to the beverage container by means of a compression fit.

The sealing member may include a pull tab that allows for removal of the sealing member and extraction of the disc off of the center structure of the lid for use.

In the preferred method of packaging, disc media is inserted into and releasably retained within the lid by means of the cylindrical inner structure, and sealed therein by the attachement of the a sealing member. A beverage is poured into the beverage chamber, and stored therein by means of attachment of the cylindrical lid. A straw may then be inserted through the cylindrical inner structure and sealing member to allow drinking of the beverage. The sealing member may be removed at any time so as to gain access to the disc-shaped media stored within.

The above, as well as additional objects, features and advantages of the invention will become apparent in the following detailed description.

BRIEF DESCRIPTION OF THE DRAWINGS

The novel features believed characteristics of the invention are set forth in the appended claims. The invention itself, however, as well as the preferred mode of use, further objects and advantages thereof, will best be understood by reference to the following detailed description of illustrative embodiment when read in conjunction with the accompanying drawings, wherein:

FIG. 4 is a top plan view of the novel disc packaging device of the present invention illustrating the alternative use of a center annular post support for the disc media suspended from spokes;

FIG. 4A is a cut-away, cross-sectional side view of the device shown in FIG. 4, along line C—C, with a disc media and other materials inserted and the lid affixed;

FIG. 5 is a top plan view of the novel disc packaging device of the present invention illustrating fingers that extend from a frame carried by the side wall of the container and that provide center support for the disc media;

FIG. 5A is a cut-away, cross-sectional side view of the device shown in FIG. 5, alone, line D—D, with a disc media and other materials inserted and the lid affixed;

FIGS. 6A and 6B are cross-sectional views of alternate embodiments of the packaging device of the present invention depicting two different methods of mounting the disc media support member to the device outer wall;

FIG. 7 is a cut-away, cross-sectional side view of an alternative embodiment of the present invention with disc media and other materials inserted, the protective element inserted and the lid closed, in which the first chamber in which the disc media is stored is in the cover;

FIG. 7A is a cut-away, cross-sectional side view of an alternative embodiment of the device shown in FIG. 7, wherein the disc media is inserted into a protective envelope that is affixed to the inner surface of the cover;

DETAILED DESCRIPTION OF THE INVENTION

Figure 1:
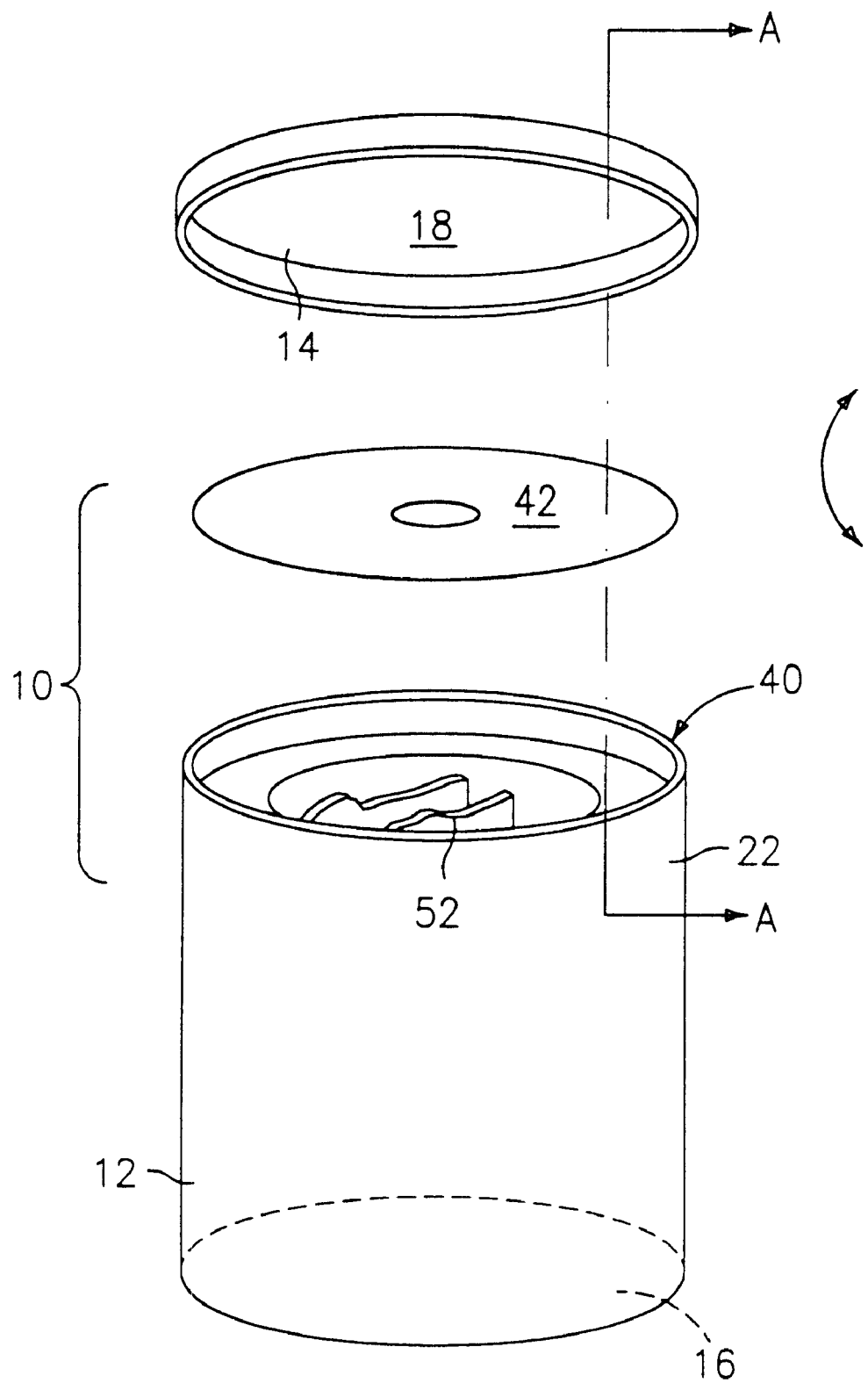
FIG. 1 is an exploded perspective view of the novel disc packaging device of the present invention with the lid and disk media removed, illustrating the use of a one-piece annular collar member with an annular ring and lip.

With reference now to the figures and in particular with reference to FIG. 1, there is shown a front view of the disc packaging device 10 of the present invention. As illustrated, disc packaging device 10 includes a lower base component or container 12 and an upper cover component or lid 14. Lower base component 12 and upper cover component 14 are utilized to form a generally cylindrical packaging device of dimension slightly larger than the disc shaped recording media to be stored. End plates 16 and 18 cooperate with lower base component 12 and upper cover component 14 to fully enclose the cylindrical packaging space defined thereby.

Figure 2:
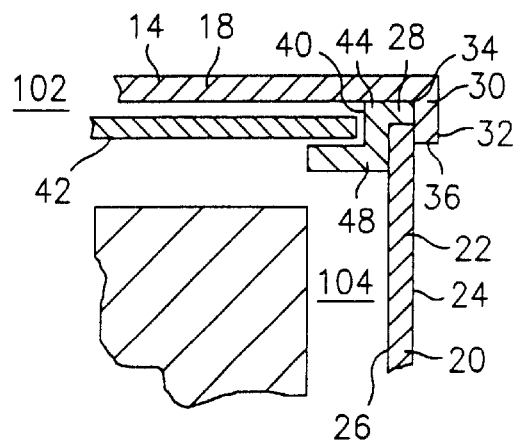
FIG. 2 is a cut-away, cross-sectional side view of a portion of the novel disc packaging device of FIG. 1 when the lid is on the container, along line AA illustrating the resultant first and second chambers thereof.

The lower base component 12 of the embodiment of this invention shown in FIGS. 1 and 2 includes a side wall 20. The side wall can be constructed from either cardboard (i.e., natural fiber material) or plastic (i.e., man-made synthetic material) or other material suitably rigid for the base component to retain its shape, including metal, e.g., as in a vacuum sealed, canned product.

The base component 12 can be designed to threadably receive the bottom plate 16 which is of conventional design, made of stiff cardboard, plastic, metal or some similarly rigid material and used as a cover-all screw cap on a very wide variety of containers. Alternatively the bottom plate 16 can nest inside the side wall 20 where it is held by friction, stapling, gluing or some other means. The side wall 20 has an upper section 22 and the upper section 22 can be threaded to accommodate the upper cover component 14 although in the embodiment shown in FIGS. 1 and 2 the cover is made of plastic and snaps on in a conventional manner.

As best seen in FIG. 2, the upper section 22 is defined by an outer wall 24, an inner wall 26 and a rim 28. The cover component 14 has a side wall 30 defined by an outer wall 32, an inner wall 34 and a rim 36. The diameter of the inner wall 34 of the cover component is slightly greater than the diameter of the outer wall 24 of the base component. In the embodiment shown in FIGS. 1 and 2, there is an inner structure 40 which provides circumferential support for a disc shaped media 42 stored within the packaging device 10. The structure 40 comprises an annular collar 44 having an annular ring 46 and an annular lip 48. The inner structure 40 nests within the lower base component 12. The annular collar 44 has an outer diameter greater than the diameter of the inner wall 26 of the base component such that the annular collar extends beyond the inner wall 26 and sits on top of the base rim 28. The annular ring 46 has an outer diameter less than the diameter of the inner wall 26, such that the annular ring nests inside the inner wall 26. The annular lip 48 has an inner diameter less than the outer diameter of the disc shaped media 42. Thus, the disc shaped media will rest on the annular lip, inside the annular ring. In this way, movement of the disc shaped media in the plane of the disc shaped media is precluded by the annular abutment 46. Movement of the disc shaped media perpendicular to its plane is prevented in one direction by the annular lip 48. When the cover component 14 is affixed to the base component 12, the cover plate 18 acts to preclude movement of the disc shaped media in the opposite perpendicular direction to the plane of the disc shaped media.

Figure 2A:
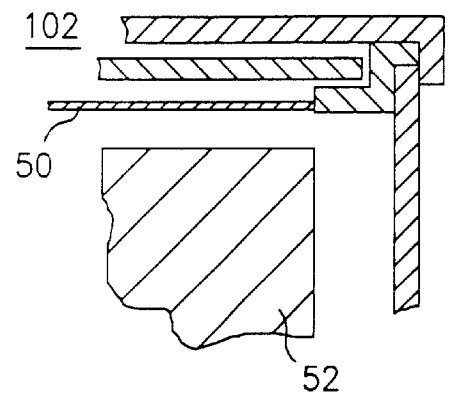
FIG. 2A is an alternative embodiment of the device shown in FIG. 2, wherein a protective element is inserted between the first and second chambers.

In the embodiment disclosed in FIG. 2A, a protective member 50 is attached to the annular lip 48. The protective member can be made of plastic film or any other conventional material to provide a barrier between the disc shaped media and other materials 52 which can be stored in the base component 12 of the packaging device 10. The protective member can be permanently affixed to the annular lip or it can be affixed at the time of assembly and shipment and removed by the consumer after purchase, i.e., at a time when further "rough handling" that would cause interaction between the disc shaped media and the other materials is less likely to occur.

Figure 2B:
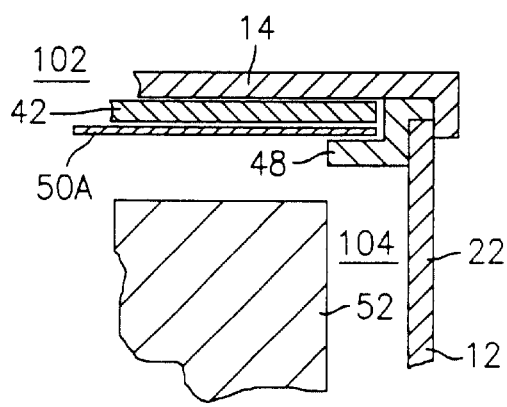
FIG. 2B is an alternative embodiment of the device shown in FIG. 2A, showing an alternative method of insertion of the protective element between the first and second chambers.

In an alternative embodiment disclosed in FIG. 2B, the protective element is removable and sized to seat on the annular lip 48 between the annular lip 48 and the disc shaped media. The protective element is round like the disc shaped media and has a central opening into which one's finger can be inserted to engage, lift and remove the protective element and subsequently engage, lift and replace the protective element.

Figure 2C:
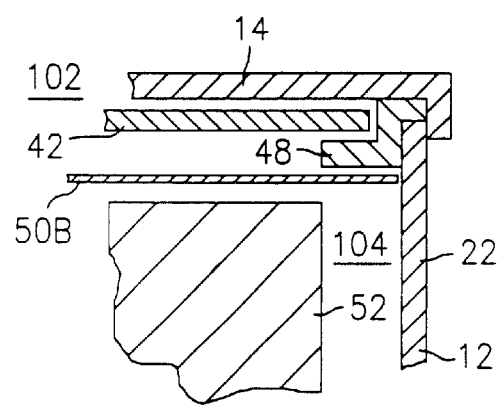
FIG. 2C is a further alternative embodiment of the device shown in FIG. 2A, showing, a further alternative method of insertion of the protective element between the first and second chambers.

In an alternative embodiment disclosed in FIG. 2C, the protective element 50B is flexible and is removably inserted within the lower base component beneath the annular lip 48 and on top of the other materials 52 placed therein. The protective element is sized to correspond to the interior wall 26 and has a central opening into which one's finger can be inserted to engage, lift and remove the protective element and subsequently engage, lift and replace the protective element. Alternatively, the protective element can be provided with a lift tab or some other conventional means whereby it can be grabbed and removed.

Figure 3:
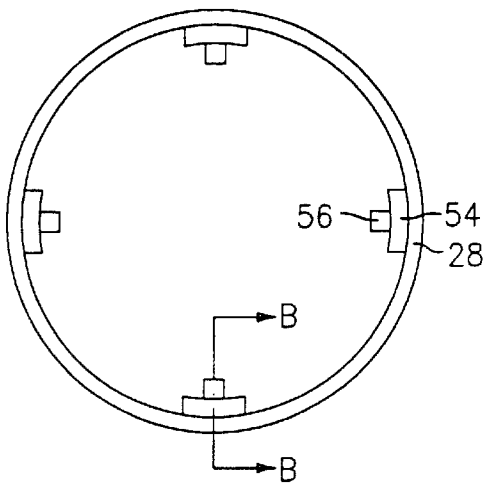
FIG. 3 is a top plan view of the novel disc packaging device of the present invention illustrating the alternative use of abutments and protrusions affixed to the inside wall of the container.
Figure 3A:
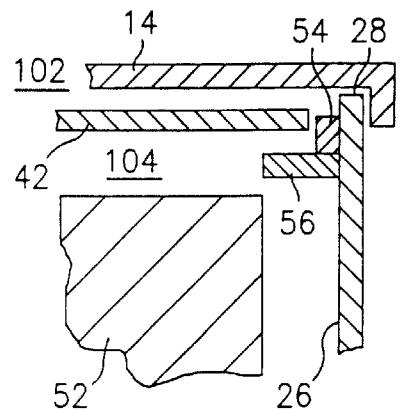
FIG. 3A is a cut-away, cross-sectional side view of a portion of the device shown in FIG. 3, along line B—B, with a disc media and other materials inserted and the lid affixed.

In the alternative embodiment shown in FIGS. 3 and 3A, the inner structure 40 is modified. The annular collar 44 with annular ring 46 and annular lip 48 is replaced by discrete abutments 54 and discrete protrusions 56. Collectively, the abutments 54 and protrusions 56 are positioned within the lower base component 12 around the circumference of the inner wall 26 spaced below the rim 28, affixed to the inner wall 26, so as to perform the same function as the annular ring 46 and annular lip 48. Specifically, the abutments 54 preclude movement of the disc shaped media in the plane of the disc shaped media i.e., performing the same function as the annular ring 46. Similarly, the protrusions 56 are positioned about the inner wall 26 and collectively preclude movement of the disc shaped media in a direction perpendicular to plane of the disc shaped media i.e., performing the same function as the annular lip 48.

Figure 3B:
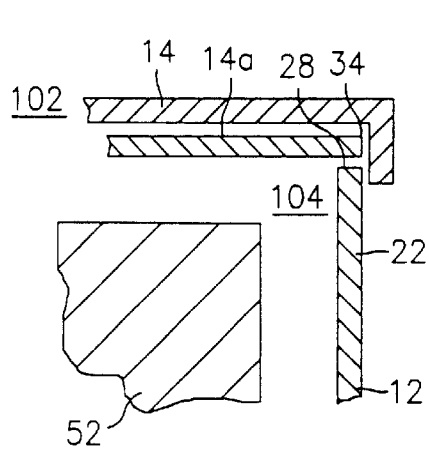
FIG. 3B is a cut-away, cross-sectional side view of an alternative embodiment of the novel disc packaging device of the present invention illustrating the alternative use of the upstanding rim of the base and the inside wall of the cover in place of the abutments and protrusions of FIG. 3.

FIG. 3B shows a further alternative embodiment wherein the disc shaped media is seated on the rim 28 and movement of the disc shaped media perpendicular to its plane is prevented in one direction by the rim 28. When the cover 14 is affixed to the base component 12, movement of the disc shaped media in the plane of the disc shaped media is precluded by the inner wall 34 of the cover 14 and inner surface 14a of the cover 14 acts to preclude movement of the disc shaped media in the second, opposite perpendicular direction to the plane of the disc shaped media.

Figure 3C:
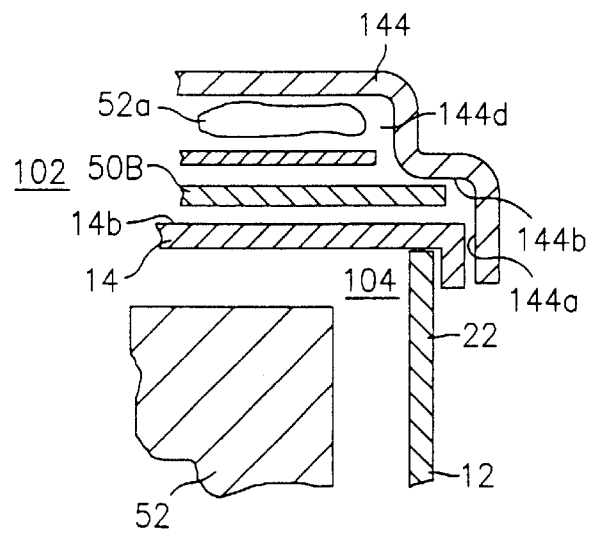
FIG. 3C is a cut-away, cross-sectional side view of an alternative embodiment of the novel disc packaging device of the present invention illustrating the alternative use of the outer surface of the cover and the inner surface of a supplementary cover in place of the abutments and protrusions of FIG. 3.

FIG. 3C shows a further alternative embodiment wherein the disc shaped media is seated on the outside surface 14b of the cover 14 and movement of the disc shaped media perpendicular to its plane is prevented in one direction by a supplementary cover 144 that snaps onto the cover 14. When the supplementary cover 144 is affixed to the cover 14, movement of the disc shaped media in the plane of the disc shaped media is precluded by the inner wall 144a of the supplementary cover 144 and the inner wall 144b of the supplementary cover 144 acts to preclude movement of the disc shaped media in the second, opposite perpendicular direction to the plane of the disc shaped media. The supplementary cover 144 can include a chamber 144d and a protective element 50b can be inserted to prevent contact between the disc shaped media and whatever materials 52a are placed in the chamber 144d.

In the alternative embodiment seen in FIGS. 4 and 4A, the inner support structure 40 is replaced with an inner support structure 58 that provides center support for the disc shaped media as opposed to the circumferential support provided by inner structure 40. In the embodiment shown in FIGS. 4 and 4A, the alternative inner structure 58 includes an annular ring 60 and spokes 62 extending therefrom. As seen in FIG. 4A, the annular ring 60 has a raised portion 64 on which the disc media 42 sits, The spokes 62 each have a finger portion 66 which extends upwardly and outwardly such that when the structure 58 is inserted into the base component 12, the fingers 56 frictionally engage the inner wall 26 and sit on the upper rim 28. The structure 58 can include webbing between the fencers 56 (ala the webbing in a duck's foot) comprised of a thin material to provide protection for the disc shaped media 42 from the other materials 52. Inside the annular ring 60 would be left open to allow the consumer, after removing, the cover 14, to insert their finger into the annular ring and to thereby remove both the disc shaped media 42 and the structure 58.

FIGS. 5 and 5A show a further alternative inner structure 68 comprising an annular collar 70 from which fingers 72 extend inwardly. At the ends of the fingers 72 are upstanding projections 74. The annular collar 70 nests inside the inner wall 26 and sits on the rim 28 in the same manner as the inner structure 40 in the embodiment shown in FIGS. 1 and 2. The upstanding projections 74 cooperate to provide a center support structure for the disc shaped media.

As seen in FIGS. 6A and 6B, the fingers 72 in the embodiment shown in FIGS. 5 and 5A do not necessarily need to be suspended from an annular collar. Alternatively, the could be clipped to the side wall 20 as seen in FIG. 6A or they could be screwed into the side wall 20 as shown in FIG. 6B.

In an alternative embodiment shown in FIG. 7, a center support structure is provided for the disc shaped media in the upper cover component 14. Specifically, projections 80 extend from the inside wall 82 of the end plate 18. These projections 80 cooperate to provide secure support for the disc shaped media in the cover component 14. A protective element 84 can be provided which is either removably nested within the cover as shown or which can be inserted at the time of manufacture and removed and discarded by the consumer after purchase. The cover 14 can engage the base component 12 in any variety of conventional ways, e.g., snap on, telescope on, screw on, etc.

In a further alternative embodiment shown in FIG. 7A, the disc shaped media is encased within an envelope 84a made of plastic or some other suitable material and which is affixed to the inside wall 82 of the end plate 18. The envelope is either removably or permanently affixed, e.g., by gluing, with double-sided tape, or by other conventional means. The envelope can itself constitute a re-useable packaging container for the disc shaped media that either remains affixed to the plate 18 or can be removed from the plate 18, e.g., so that the cover 14 can be discarded. Or the disc shaped media can be packaged within a packaging sleeve (not shown) ail of which can then be inserted into the envelope and then removed from the envelope once the envelope is opened.

Figure 8:
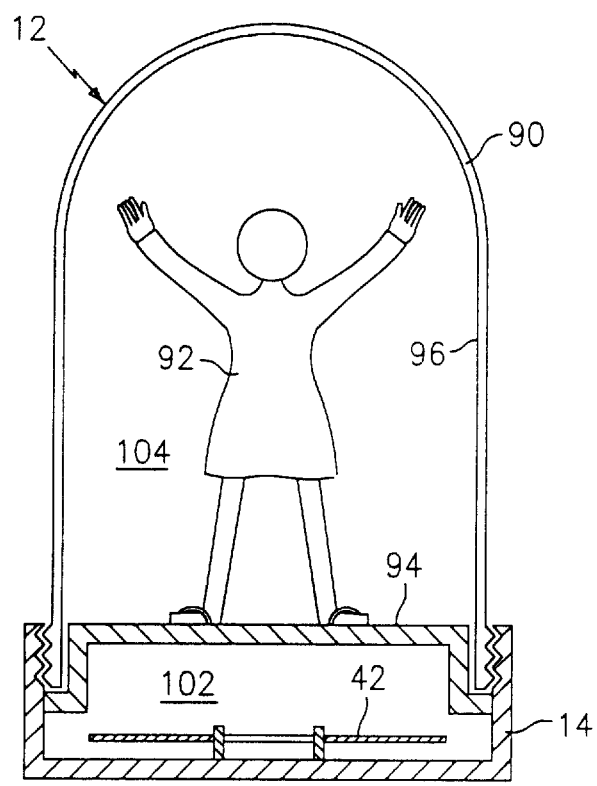
FIGS. 8 and 8A are side perspective, partially cut-away, cross-sectional views of alternative embodiments of the present invention, illustrating the use of the "lid" of the embodiment shown in FIG. 7 as the base, thereby allowing the portion of the invention defining the second chamber to be of an irregular shape (FIG. 8) or to have deformable construction (FIG. 8A)
Figure 8A:
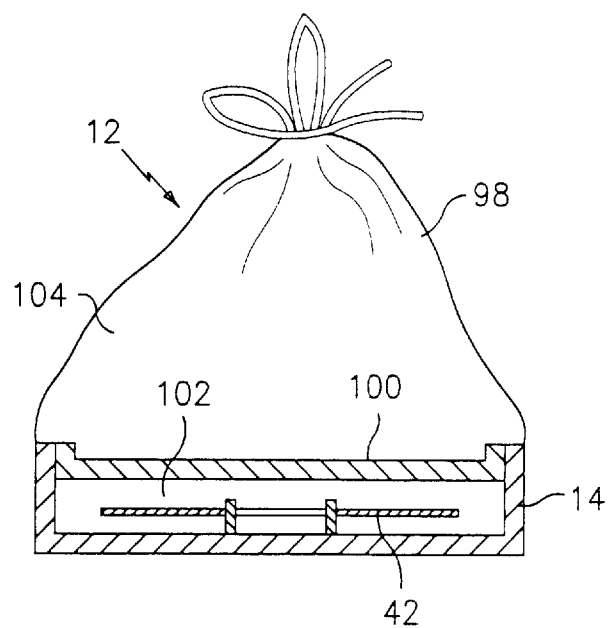

FIGS. 8 and 8A show further alternative embodiments of the present invention. In FIG. 8, the fact that the disc shaped media is stored within the cover component 14 allows for an alternative construction of the container 12. In this alternative embodiment, the cover 14 serves as the "base". The alternative base 90, in which the other materials, in this case, a doll 92, are stored, has an end wall structure 94 which frictionally encases the inner wall 96 and seals the chamber in the base 90. Alternatively, wall 94 can be provided with threads so that it will threadably engage corresponding threads on the inside wall 96. The cover 14 and base 90 can be attached in the same manner as heretofore been discussed in connection with other embodiments.

In the embodiment showing in FIG. 8A, the cover 14 once again carries the disc shaped media 42 and thereby allows the base 12 to be of a deformable construction 98. The deformable member 98 has a rigid internal support structure 100 which is designed to frictionally or threadably engage the cover 14.

Figure 9:
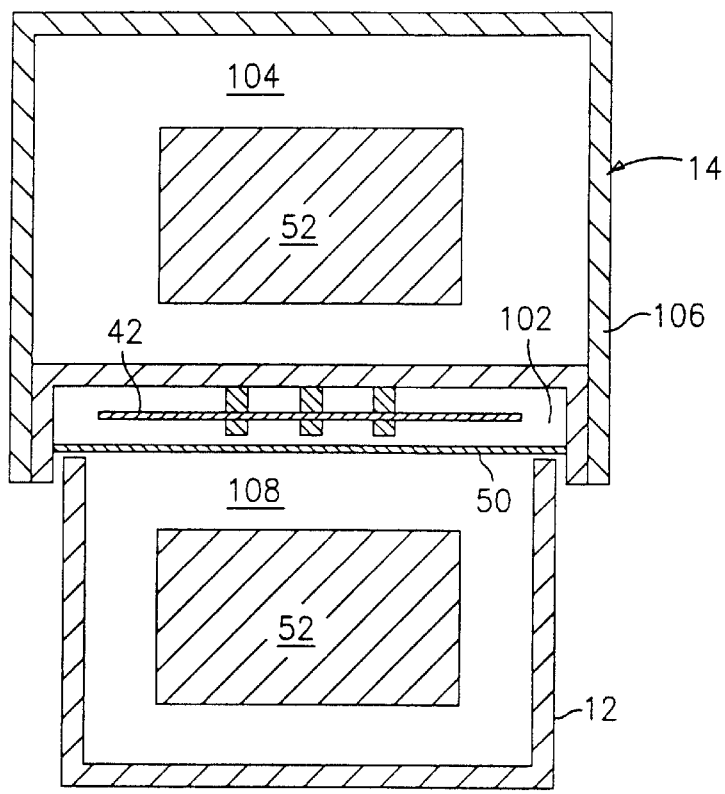
FIG. 9 is a cut-away, cross-sectional side view of an alternative embodiment of the present invention in which the disk media is located in the lid and the lid and the container include second and third chambers, respectively, for storing other material.
Figure 10:
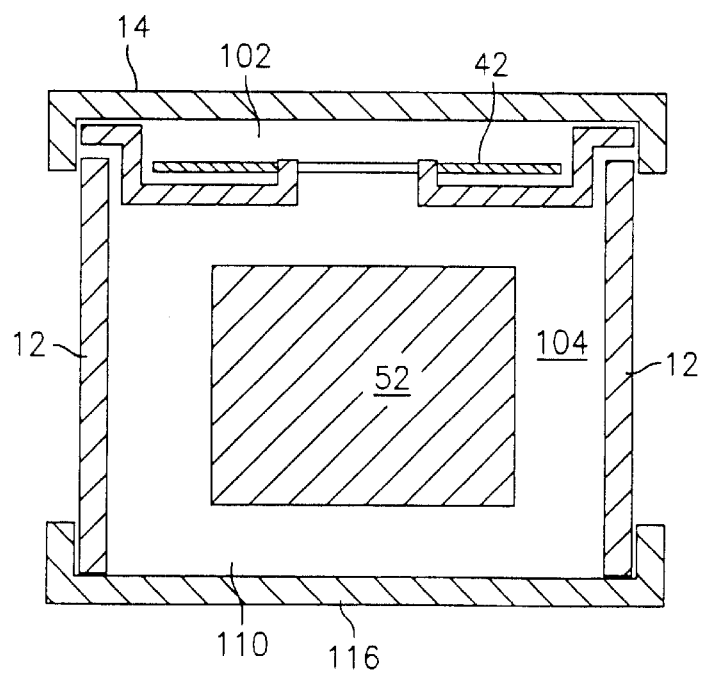
FIG. 10 is a cut-away, cross-sectional view of another embodiment of the present invention in which the second chamber in the container for storing other materials includes a second opening separate and distinct from the lid and a removable cover such that access to the second chamber can be attained without removing the lid.

In the alternate embodiment shown in FIG. 9, the disc shaped media is stored in a first chamber 102 in the lid 14 defined by an annular support 40 similar in construction to the embodiment of FIG. 7, except that the lid includes a second chamber 104 defined by an outer wall 106 for other materials and the base 12 includes a third chamber 108. In the alternate embodiment shown in FIG. 10, which is similar in construction to the embodiment of FIG. 4, there is provided an additional opening 110 in the container 22 and a cover 116 for closing the opening 110. The cover 116 can be removed to gain access to the chamber 104 without removing the cover 14.

Figure 11:
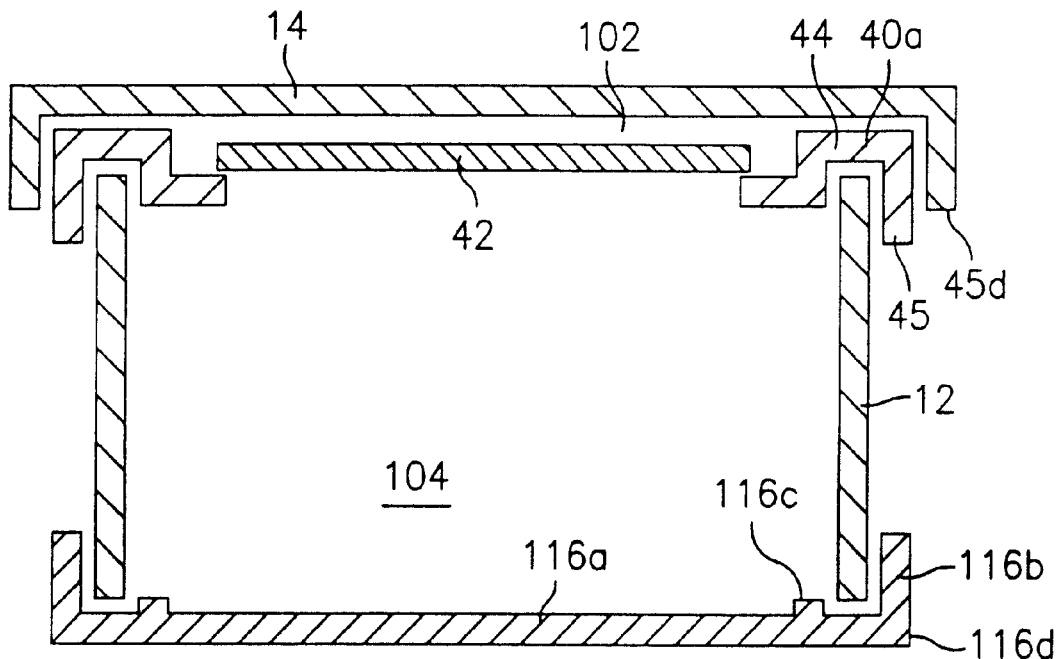
FIGS. 11 and 11A are cut-away, cross-sectional side views of another embodiment of the device shown in FIG. 10 in which the method of mounting shown in FIG. 6A is utilized and wherein the removable cover for the second chamber can be mated with the removable cover for the first chamber to form a mini-packaging device shown in FIG. 11A.
Figure 11A:
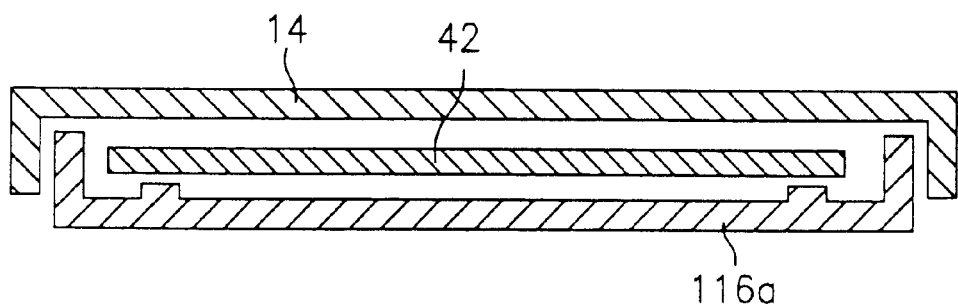

In the alternative embodiment shown in FIGS. 11 and 11A, an inner structure 40a is provided that is a slightly modified version of the inner structure 40 shown in FIG. 2, in that it includes an annular wall 45 that extends around the entire circumference of the annular collar 44 and engages the outer surface of the wall of the base 12, and the cover 14 is configured to engage not the base 12, but rather, the annular wall 45. An additional opening 110 is provided as in the embodiment of FIG. 10, and a cover 116a is provided that is a slightly modified version of the cover 116 of FIG. 10, in that it includes not only an outer annular wall 116b for engaging the outer surface of the wall of the base 12, but also an inner annular wall 116c for engaging the inner surface of the wall of the base 12. The circumferential dimension of the outer surface 116d of the wall 116b of the cover 116a is identical to the circumferential dimension of the outer surface 45d of the wall 45, such that the covers 14 and 116a can be removed and the cover 14 which matingly engaged the wall 45 will matingly engage the outer wall 116b of the cover 116a, as shown in FIG. 11A. In this way, as also shown in FIG. 11A, the covers 14 and 116a can be used together as a mini-packaging device for the disc shaped media 42. In the embodiment shown, the inner wall 116c helps to securely retain the disc shaped media against movement. However, it is understood that the benefits of the invention could be achieved without such inner wall, or utilizing one of the other retaining methods disclosed herein.

Figure 12:
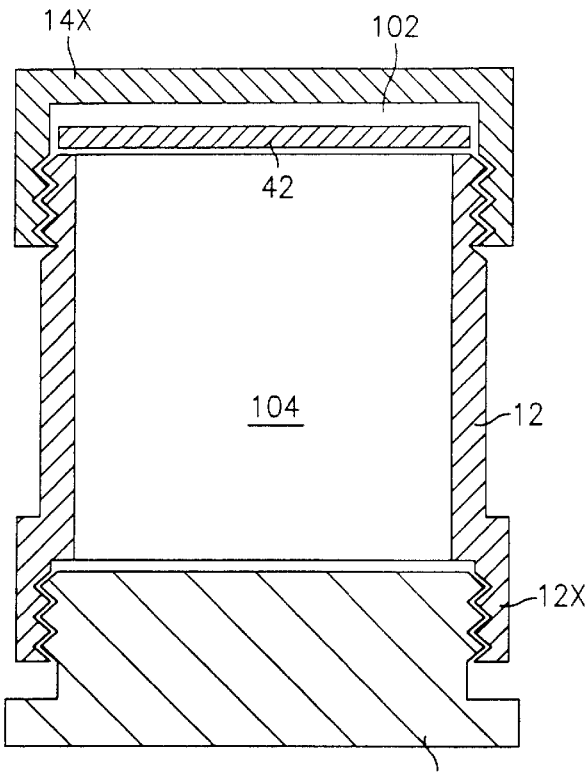
FIG. 12 is a cut-away, cross-sectional side view of an alternative embodiment of the device shown in FIGS. 11 and 11A in which the method shown in FIG. 3B for retaining the disc media is utilized and in which the two covers threadably engage the base and, when removed, can be threaded together to create a mini-packaging unit.

In the alternative embodiment shown in FIG. 12, the disc shaped media seats on the rim 28 as in the embodiment shown in FIG. 3B, but the cover 14x does not snap onto the base 12, but rather, threadably engages it. Furthermore, the bottom 12x of the base 12 is flared outwardly and contains internal threads that are of the same dimension as the internal threads of the cover 14x. The cover 116x includes mating external threads such that the cover 116x can be threaded into the flared bottom 12x of base 12. In this way, the covers 14x and 116x can be removed from the base 12 and threadably engaged to form a mini-packaging unit for the disc shaped media.

Figure 12A:
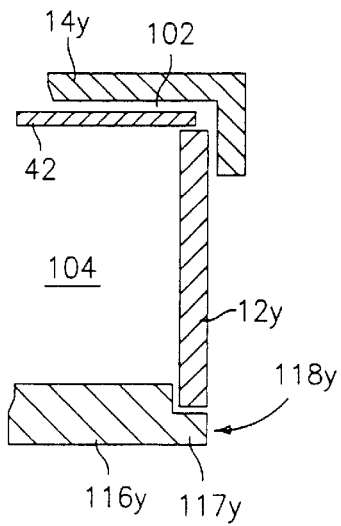
FIGS. 12A and 12B are cut-away, cross-sectional side views of alternative embodiments of f the device shown in FIG. 12, wherein the two covers slidably engage after removal (FIG. 12A) or threadably engage after removal (FIG. 12B)
Figure 12B:
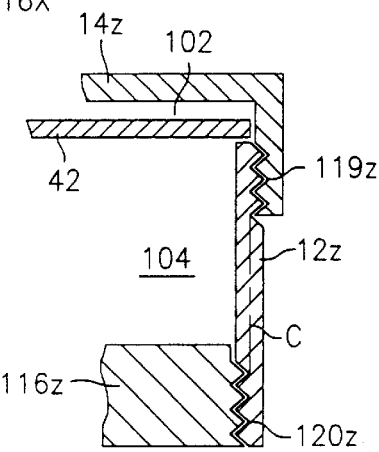

In the alternative embodiments of FIGS. 12A and 12B, the need to flare out the bottom of the base 12 is eliminated. In FIG. 12A, the base 12y receives a bottom cover 116y that includes an overlapping portion 117y, the outer surface 118y of which is of equal dimension to the outer surface 118y of which is of equal dimension to the outer wall of the base 12y, such that covers 14y and 11y can be slidably engaged to form a mini-storage unit for the disc media. In FIG. 12B, the base 12z has an external threaded portion 119z and an internal threaded portion 120z each of which extends beyond the center line "C" of the wall of the base 12z. In this way, when the covers 14z and 116z are removed, they can be threadably engaged to form a mini-storage unit for the disc media.

Figure 13:
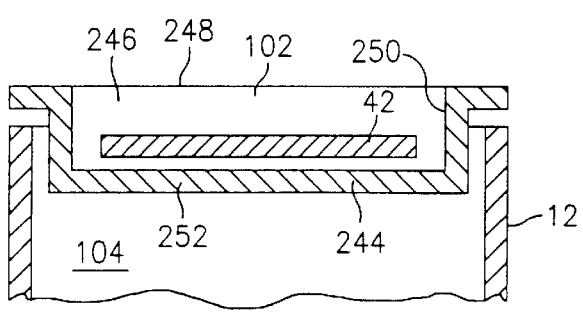
FIG. 13 is a cut-away, cross-sectional side view of another embodiment of the present invention in which a concave cavity on the exterior side of the cover for the device forms the first chamber for the disc media and a seal encloses the disc media within the concave cavity.

FIG. 13 shows a further alternative embodiment, wherein the cover 244 nestingly seats within the base 12 and the disc shaped media 42 is placed within the concave recess 246 of the cover 244. A seal 248 made of plastic or other suitable material is applied to the cover 244 to hold the disc shaped media within the cover 244 until the seal is removed by the user. The disc shaped media can be retained against movement within the cover 244 as a result of contact with the side walls 250, bottom wall 252 and seal 248, or by utilization of any of the other methods taught herein.

Figure 14:
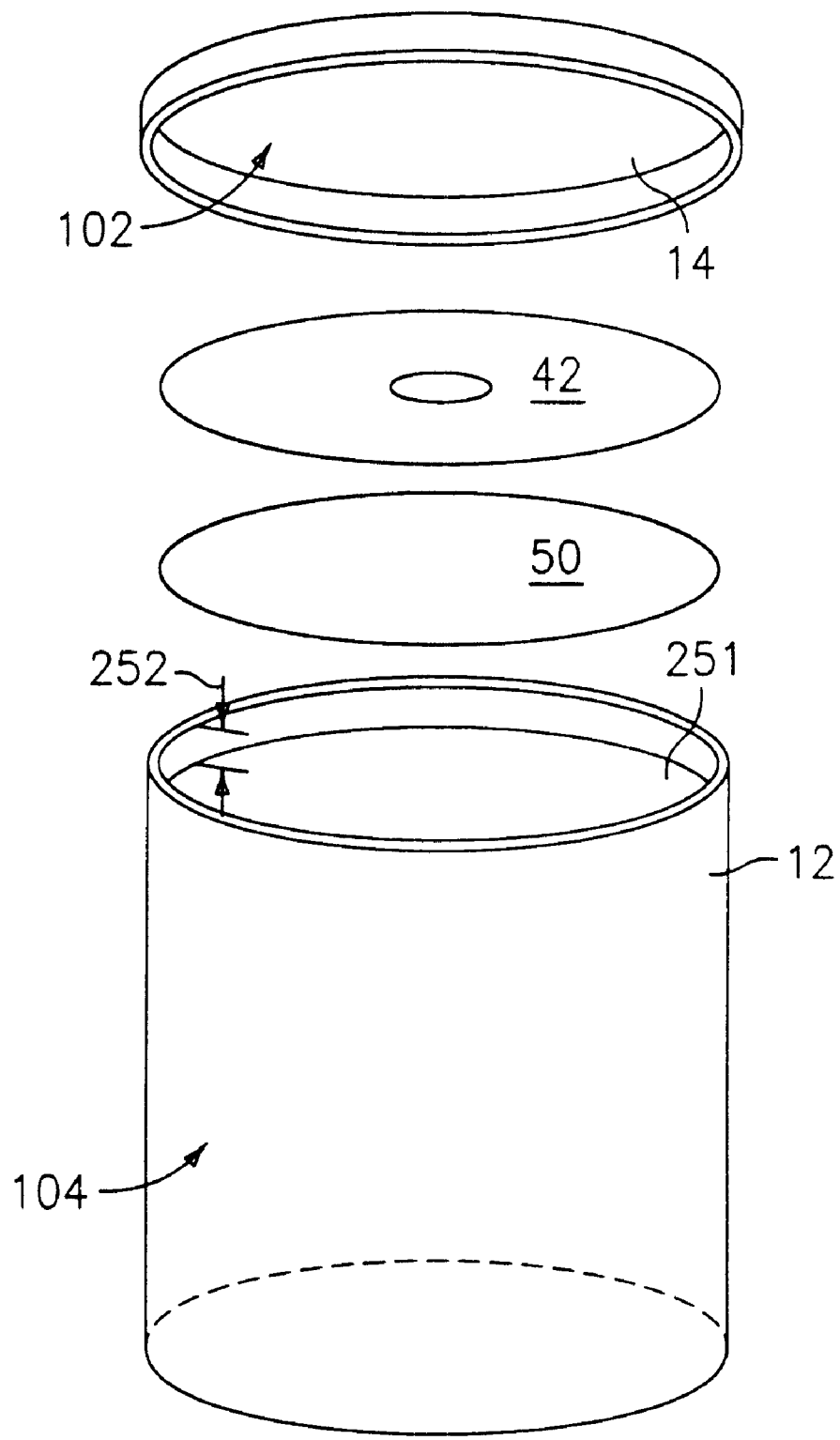
FIG. 14 is an exploded perspective view of a further alternative embodiment of the novel disc packaging device of the present invention with the lid, disk media and protective element removed, illustrating the use of a sealed base.

FIG. 14 shows a further alternative embodiment wherein the base 12 is a separately manufactured container of miscellaneous content, that includes a slightly concave end 251, the depth 252 of which exceeds the combined thickness of a disc shaped media 42 and a protective element 50 which are seated within the concave end 251 and held there by cover 14 which snaps onto base 12. In an alternate embodiment, a protective element is not used or the disc shaped media is packaged in an envelope (not shown).

Figure 15:
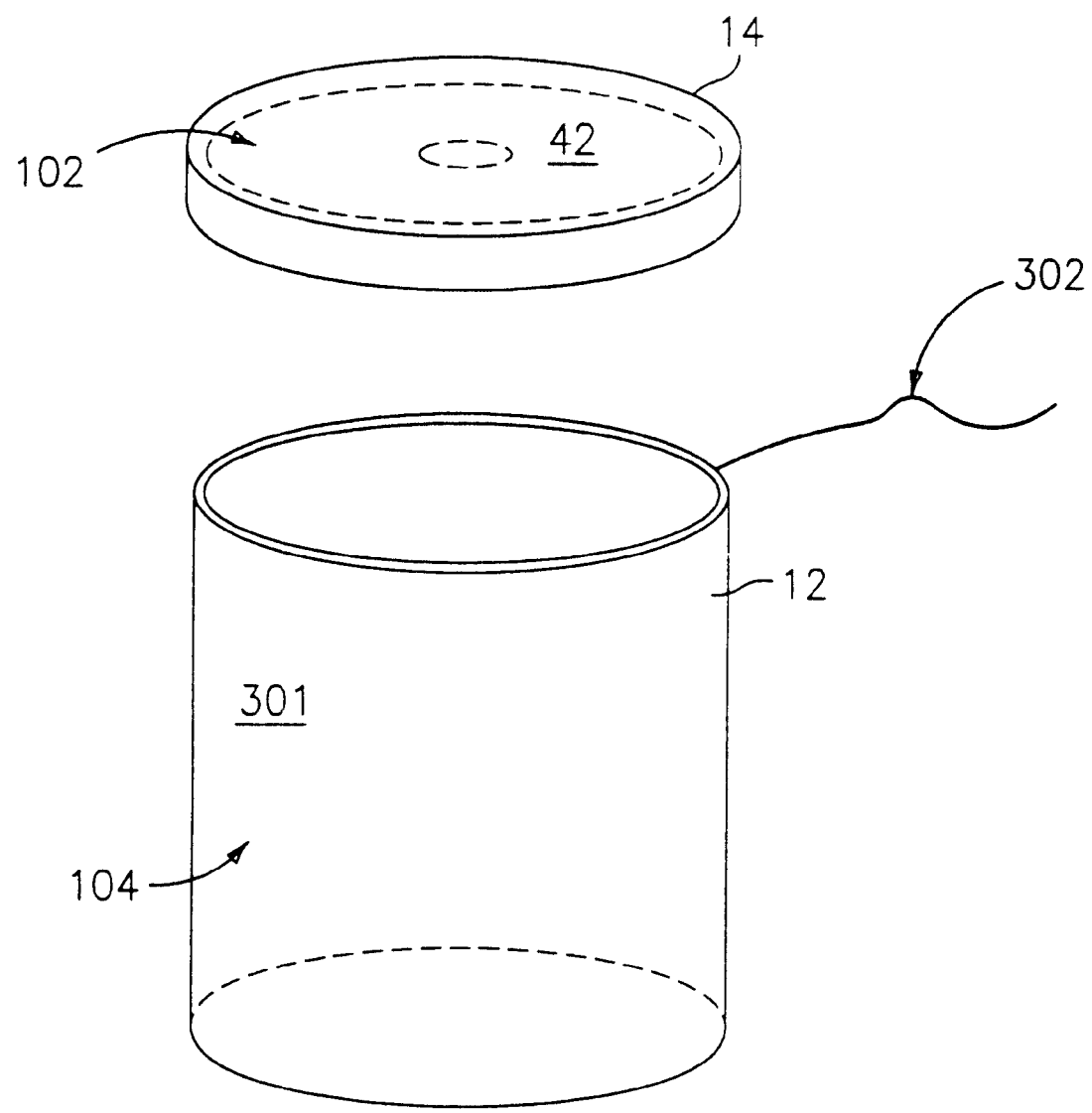
FIG. 15 is an exploded perspective view of a further alternative embodiment of the novel disc packaging device of the present invention in which the disk media is sealed within the lid, and the base is separately sealed, and the lid and base are detachably joined together by an outer packaging skin that can be severed with a pull string.
Figure 16:
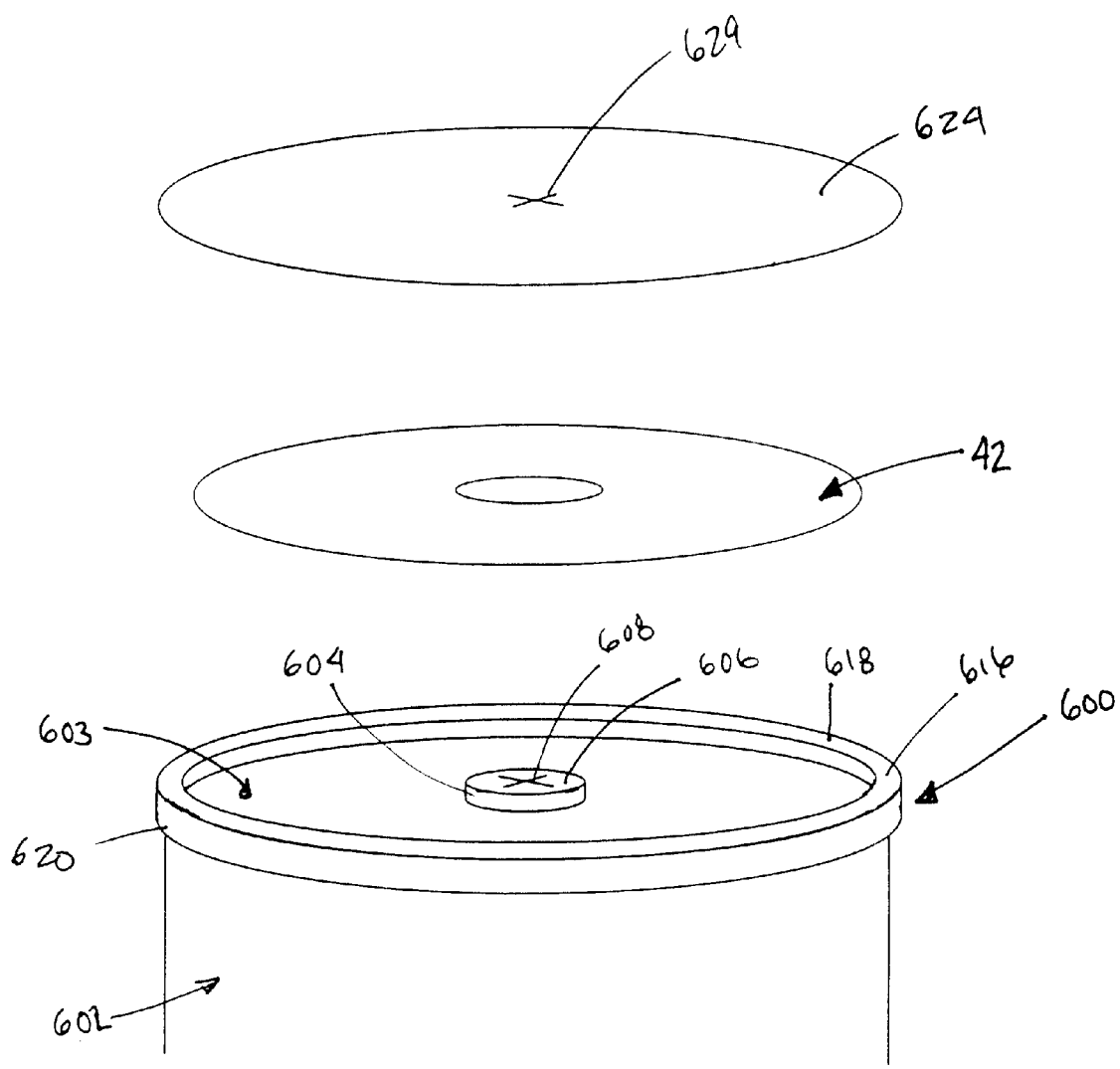
FIG. 16 is an exploded elevational view of another embodiment of the novel disc packaging device of the present invention in which the disc media is retained in a cylindrical lid including means for engaging, retaining and sealing therein the disc-shaped media, and allowing passage therethrough of a straw, and a sealing means working in conjunction therewith, which cylindrical lid may then be attached to a beverage container.
Figure 17:
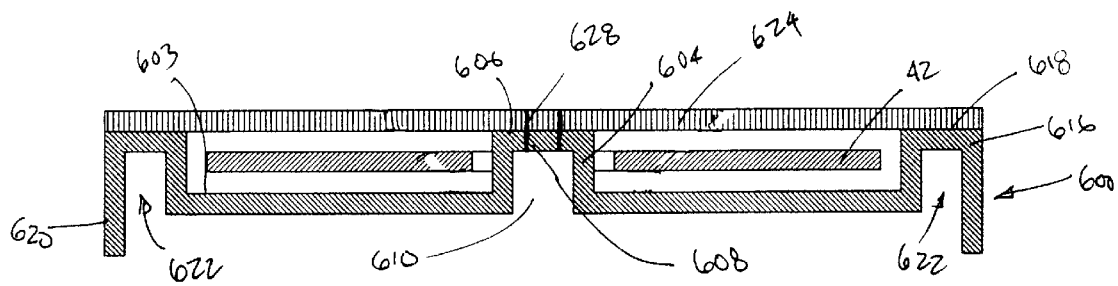
FIG. 17 is a cut-away, cross-sectional view of the embodiment of FIG. 16.

FIG. 15 shows a further alternative embodiment wherein the disc shaped media is mounted and sealed within cover 14, e.g., as taught herein in connection with other embodiments, and cover 14 is attached to base 12 by paper packaging material skin 301 that binds the cover 14 and base 12 together. Cover 14 is separated from base 12 by pulling string 302 which tears the skin 301 and brakes the circumferential attachment between cover 14 and base 12.

It would be understood that in each embodiment, a container device is provided in which disc shaped media can be packaged, distributed, displayed at retail and, if desired, restored with other materials and that, in effecting such usage, discrete chambers are provided for the disc media and for the other materials so as to prevent contact between the disc media and the other materials. In the embodiments shown in FIGS. 1 through 6B, the inner structure, whether it is the annular collar of FIG. 1, or the discretely positioned abutment/protrusion clips of FIG. 3, or the upstanding rim in FIG. 3B, or the lid and supplemental lid of FIG. 3C, or the "spider" structure of FIG. 4, or the "trap" structure of FIG. 5, in each case is located in and helps define a first chamber in the lower base component 12. Underneath this first chamber is a second chamber. The first chamber receives and securely holds, despite repeated removal and re-packaging, the disc shaped media. The second chamber receives the other materials and keeps these materials separate from the disc shaped media. The need for a separate "jewel case" for the disc shaped media is thus completely eliminated.

It would be understood that the shape of the container can be varied without departing from the scope of the present invention, e.g., the cylindrical base 12 can be square or rectangular so long as the outer wall of the collar 40 corresponds and the collar includes spacers from the outer wall of the collar to the annular ring and annular lip of the present invention. Similar adjustments could be made to the other embodiments as would be apparent to those skilled in the an having reviewed this disclosure. The abutment/protrusions clips of FIG. 3 could be mounted on a noncylindrical shaped base, as could the spider structure of FIG. 4 or the trap structure of FIG. 5.

It would be understood by those skilled in the art that the function of the annular ring of FIG. 1 or the abutments of FIG. 2 could be performed by an appropriately dimensioned inner wall 26 of the container 12.

It would be further understood that while several methods of attaching the annular collar of FIG. 1, the abutment/protrusion clips of FIG. 2, the spider structure of FIG. 3 and the trap structure of FIG. 4 have been shown, those skilled in the art after having reviewed this disclosure could devise other means of attachment without departing from the scope of the present invention.

It would be further understood by those skilled in the art that the device and method of this invention can accommodate one or more disc shaped media, e.g., through the insertion of protective elements therebetween.

Illustrated in FIGS. 16–19 is another embodiment of the present invention in which the disc-shaped media 42 is received and retained within a cylindrical lid 600, which can be affixed as a cover to a beverage container 602 such as the kind which is often sold or given away as a promotional item in connection with the purchase of a large fountain beverage. Smaller beverage containers 602 are ideally suited for a mini CD or 80 mm diameter optical discs.

The lid includes a substantially planar upper surface 603 upon which is provided a cylindrical support structure 604 having a substantially planar end 606. Disposed within said planar end 606 is a lid opening 608 having a diameter less than that of the cylindrical support structure 604, which opening leads to a passageway 610 through the support structure 604. The cylindrical support structure 604 serves the dual purpose of: (1) receiving and retaining the disc-shaped media such that the disc-shaped media 42 is prevented from moving linearly either perpendicularly or parallel to the plane of the disc-shaped media 42, while allowing the disc-shaped media 42 to rotate around the cylindrical support structure 604; and (2) providing access through the passageway 610 through the cylindrical lid 600 through which a straw (not shown) may be inserted. Toward that end, the inner diameter of cylindrical support structure 604 must be sufficiently large so as to allow the passage of the straw therethrough, while the outer diameter of the cylindrical support structure 604 must be slightly less than the diameter of the annular aperture in the disc-shaped media 42 such that the cylindrical support structure 604 will allow the disc-shaped media 42 to be mounted thereon.

Figure 18:
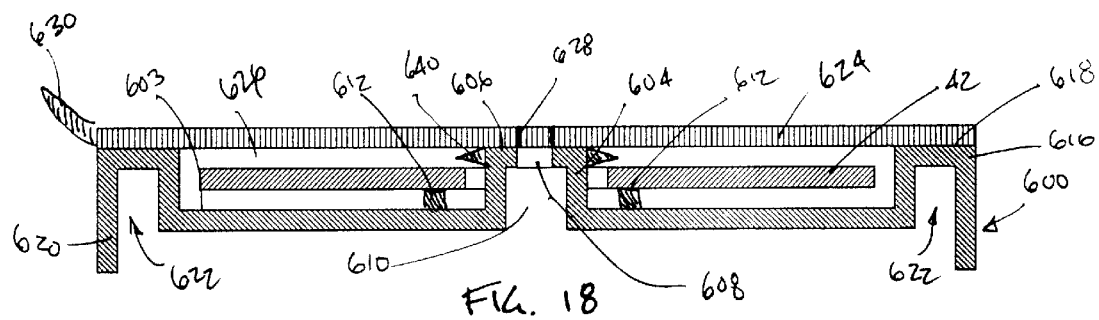
FIG. 18 is a cut-away, cross-sectional view of another embodiment of FIG. 16.
Figure 19:
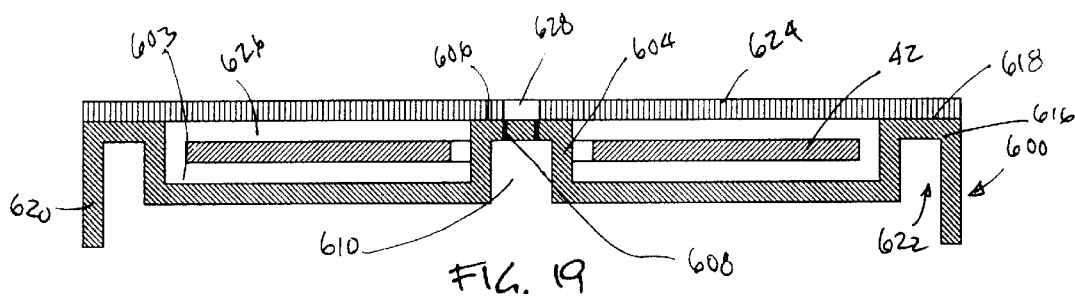
FIG. 19 is a cut-away, cross-sectional view of yet another embodiment of FIG. 16.

In an alternate embodiment shown in FIG. 18, the disc-shaped media 42 may be further supported within the cylindrical lid 600 by means of an annular shoulder 612 or other raised portion rising from the upper surface 603 and encircling the cylindrical support structure 604, which shoulder 612 separates the disc-shaped media 42 from the upper surface 603 of the cylindrical lid 600. The height of upper shoulder 612 should be such that it limits contact between the disc-shaped media 42 and the upper surface 603 of cylindrical lid 600.

Cylindrical lid 600 also includes an annular shelf 616 spaced distally from the cylindrical support structure 604, in the vicinity of the periphery of the upper surface 603 of the cylindrical lid 600. The shelf 616 includes a shelf top 618 which is co-planar with planar end 606 of the cylindrical support structure 604. It should be appreciated, however, that the height of the planar end 606 and the shelf top 618 need not be co-planar, provided that they are higher than the thickness of the disc-shaped media 42. The annular shelf 616 is designed in part to provide protection to the edges of the disc-shaped media 42, and therefore has a diameter that is at least slightly larger than the diameter of the disc-shaped media 42. In addition, the annular shelf 616 serves to act as a buffer against any transmission force applied to the outer edge of the cup lid 600, including force applied to the skirt 620, to the disc-shaped media 42.

The cup lid 600 is adapted to be attached to the beverage container by means of a compression fit, whereby the upper edge of the cup lid is inserted into the gap 622 created between the portion of the cup lid 600 which carries the upper surface 603 and the skirt 620 of the cup lid 600. In the preferred embodiment, the cup lid 600 is composed of a plastic material that is somewhat deformable so as to allow the skirt 620 to bend slightly when the lid 600 is placed on the cup, but be elastic enough such that the force applied by the skirt 620 in attempting to return to its static position is enough to keep the cup lid 600 attached to the container. Inasmuch as the annular shelf 616 is designed to deform slightly while the cup lid 600 is attached to the beverage container, it should be appreciated that there should be a sufficient gap between the edge of the disc-shaped media 42 and the annular shelf 616 such that the deformation in the annular shelf 616, if any, will not cause contact with the edge of the disc-shaped media 42.

After insertion of the disc-shaped media 42 within the cup lid 600, a sealing member 624 is attached so as to prevent the beverage stored within the container from coming into contact with the disc-shaped media 42 when the cup lid is applied to the container. The sealing member 624 is essentially a waterproof element that is attached to the shelf top 618 and the planar end 606 of the cylindrical support structure 604. In the preferred embodiment, the means of attachment of the sealing member 624 to the shelf top 618 and the planar end 606 is by means of a heat seal, although other sealing means are available, including adhesives and the like. It should be appreciated, however, that whatever sealing means is used, the seals between the sealing member 624 and the shelf top 618 and the planar end 606 must be water-tight so as to prevent any leakage or spillage of the beverage within the cavity 626 formed therebetween.

While the shelf top 608 and end 606 are described as being planar, it should be understood that neither of these elements needs to be planar, as long as enough of a portion of each is provided to which the sealing means 624 can be applied to accomplish the goals herein described.

In addition to serving as a means for preventing contact between the beverage and the disc-shaped media 42, the sealing means 624 also serves to prevent the disc-shaped media 42 from moving in a direction away from of the upper surface 603 of the cup lid 600, and from sliding off the cup lid.

In order to allow passage of a straw through the passageway 610 of the cup lid 600 so as to gain access to the beverage stored in the container, a means for penetrating 628 the sealing member 624 is disposed within the center of said sealing member. The means for penetrating 628 the sealing member 624 must be situated directly above the opening 608 so as to allow for the passage of a straw therethrough. In the preferred embodiment, said means for penetrating 628 and said opening 608 are both "X"-shaped incisions, commonly referred to as a "kiss cuts."The triangular shaped "petals" formed by the "X"-shaped incision are adapted to deform so as to allow a straw to penetrate through the sealing member 624. Alternate means for penetration include circular-shaped incisions or even an opening wide enough to allow the passage of a straw therethrough, as variously shown in FIGS. 17 through 19. The only limitation as to the opening 608 and the means for penetrating 629 is that they must be large enough so as to allow the passage of a straw, while not so large as to compromise the integrity of the seal of the cavity 626.

Whatever the means for penetrating used, however, it should be appreciated that, in order to maintain the integrity of the seal between the sealing means 624 and the planar end 606 of the cylindrical support structure 604, the incision 628 (or the opening) must not be larger in diameter than the diameter of the cylindrical support structure 604, otherwise the integrity of the cavity 626 will be compromised because there will be no overlap to which the seal can be applied.

In one embodiment, disposed at the edge of the sealing means 624 is a pull-tab 630 which allows a user to break the seal of the sealing means 624 from the cup lid 600 in order to gain access to the disc-shaped media 42 stored within the cavity 626. By pulling on the pull-tab 630, the seal between the sealing means 624 and the shelf top 618 is broken, and the disc-shaped media 42 may be extracted. Once the disc-shaped media 42 has been extracted, the cup lid 600 may be reattached to the beverage container. It should be appreciated that while the pull-tab 630 is one means for gaining access to the cavity 626, it is not necessarily required, as the "tabs" created when a straw penetrates the incision 628 may also be used in the same manner as the pull-tab 630. It should further be noted that it is contemplated that the disc-shaped media can be re-inserted on the lid and the seal, if only broken but not fully removed, can be returned to a closed position, particularly if adhesive or other reattachment means is provided in the area of the pull tab 630.

It should also be appreciated that while the seal 624 in the preferred embodiment serves to retain the disc-shaped media 42 within the cavity 626, alternate retaining means exist. For example, at least one protrusion 640 may be provided on the upper portion of the support structure 604, which protrusions 640 serve to retain the disc-shaped media 42 in place on the support structure 604. Such protrusions 640 must be at least partially flexible, or the support structure 604 must be flexible, so as to allow the disc-shaped media 42 to be snapped over the protrusions 640 when attaching or removing the disc-shaped media 42.

Having thus described the invention with particular reference to the preferred forms thereof, it will be obvious that various changes and modifications can be made therein without departing from the spirit and scope of the present invention as defined by the appended claims.

What is claimed is:

1. An elongated packaging device for packaging at least one disc-shaped media having a central aperture therethrough with a cup-type beverage container having an opening therein, said packaging device comprising:
    a lid adapted to be releasably affixed to said beverage container, said lid including:
        an upper surface and a lower surface;
        means to positively receive and retain said disc-shaped media disposed on said upper surface;
        means for sealing said disc-shaped media within an air-tight chamber formed on said upper surface of said lid; and
        means for passing a straw through said lid while said lid is affixed to said beverage container without compromising the integrity of said air-tight chamber.

2. The packaging device of claim 1, wherein said lid further includes means for supporting and protecting said disc-shaped media.

3. The packaging device of claim 2, wherein said means for supporting and protecting includes means to limit said disc-shaped media from moving in a horizontal and vertical direction while allowing said disc-shaped media to rotate.

4. The packaging device of claim 2, wherein said means for supporting and protecting further includes a cylindrical support structure upon which said disc-shaped media is mounted by insertion of said cylindrical support structure through said aperture.

5. The packaging device of claim 4, wherein said lid further includes a raised external shelf extending around the periphery of said lid and having an inside diameter larger than the outer diameter of said disc-shaped media.

6. The packaging device of claim 5, wherein said means for sealing comprises a waterproof sealing member sealed to said shelf and said cylindrical support structure.

7. The packaging device of claim 6, wherein at least a first portion of said support structure and at least a second portion of said shelf are disposed at a height above said upper surface greater than the thickness of the disc-shaped media, and said means for sealing comprises a waterproof sealing member sealed to said first and second portions.

8. The packaging device of claim 7, wherein said first and second portions are substantially co-planar and said sealing member is a substantially planar member.

9. The packaging device of claim 8, wherein said sealing member is simultaneously sealed to said first and second portions.

10. The packaging device of claim 9, wherein said means for passing a straw comprises first and second apertures respectively cut in said sealing member and said upper surface, which first and second apertures are simultaneously cut at the same time said sealing member is sealed to said first and second portions.

11. The packaging device of claim 6, wherein said sealing member is heat sealed to said shelf and said cylindrical support structure.

12. The packaging device of claim 11, wherein said sealing member further includes means for removing said sealing member from said shelf and said cylindrical support structure.

13. The packaging device of claim 12, wherein said means for removing comprises a pull-tab disposed at the edge of said sealing member.

14. The packaging device of claim 1, wherein said means for passing a straw comprises a first aperture through the center of said lid.

15. The packaging device of claim 14, wherein said sealing means further includes a second aperture through the center of said sealing means, said second aperture being situated directly adjacent to said first aperture.

16. The packaging device of claim 4, wherein said support structure includes a first aperture therethrough to allow passage of said straw.

17. The packaging device of claim 16, wherein said sealing means further includes a second aperture through the center of said sealing means, said second aperture being situated directly adjacent to said first aperture.

18. The packaging device of claim 1, wherein said cup-type beverage container includes a rim defining the perimeter of said opening, and wherein said lid further includes a skirt member adapted to engage said rim and retain said lid mounted on said rim by means of a compression fit between said rim and said skirt member.

19. The packaging device of claim 4, wherein said means for supporting and protecting further includes a raised shoulder disposed about said support structure, said raised shoulder adapted to engage said disc-shaped media and raise said disc-shaped media above said upper surface.

20. The packaging device of claim 4, wherein said support structure includes at least one protrusion adapted to retain said disc-shaped media on said support structure.

21. An elongated packaging device for packaging at least one disc-shaped media having a central aperture therethrough with a cup-type beverage container having an opening therein, said packaging device comprising:

a lid adapted to be releasably affixed to said beverage container, said lid including:
an upper surface and a lower surface;
means to positively receive and retain said disc-shaped media disposed on said upper surface and means for supporting and protecting said disc-shaped media, including means to limit said disc-shaped media from moving in a horizontal and vertical direction while allowing said disc-shaped media to rotate, wherein said means to positively receive and retain and said means for supporting and protecting comprises a cylindrical support structure adapted to be inserted through said aperture in said disc-shaped media and a raised external shelf extending around the periphery of said lid and having an inner diameter larger than the outer diameter of said disc-shaped media, said cylindrical projection and said raised shelf being co-planar;
means for sealing said disc-shaped media within an air-tight chamber formed on said upper surface of said lid, said means for sealing comprises a waterproof sealing member heat-sealed to said shelf and said support structure; and
means for passing a straw through said lid while said lid is affixed to said beverage container without compromising the integrity of said air-tight chamber, said means for passing comprising a first opening through said cylindrical support structure and a second opening through said sealing member, said first opening and said second opening being directly adjacent each other.

22. The packaging device of claim 21, wherein said cup-type beverage container includes a rim defining the perimeter of said opening, and wherein said lid further includes a skirt member adapted to engage said rim.

23. The packaging device of claim 22 wherein said cup-type beverage container includes a rim defining the perimeter of said opening, and wherein said lid further includes a skirt member adapted to engage said rim and retain said lid mounted on said rim by means of a compression fit between said rim and said skirt member.

24. A method for packaging a disc-shaped media and a beverage within a closed packaging device, said method comprising the steps of:

providing a beverage within a cup-type beverage container of the type having an opening therein and from which the beverage is usually consumed with a straw;

providing a lid having a seal and at least one sealable upper chamber which can be sealed by such seal and thereafter through which a straw can be passed without compromising the integrity of said sealed upper chamber, said lid adapted to be removably attached to said cup-type beverage container, inserting said disc-shaped media into said upper chamber and positively retaining it therein;

sealing said upper chamber;

affixing said lid to said cup-type beverage container and thereby closing said opening; and passing a straw through the sealed upper chamber of said lid to access and consume the beverage without compromising the integrity of the sealed upper chamber.

25. The method of claim 24, wherein said seal can be broken to access said disc-shaped media within said upper chamber, further including the step of breaking said seal and accessing and removing said disc-shaped media.

26. The method of claim 24, wherein said cylindrical support structure includes at least one protrusion disposed thereon, further including the step of retaining said disc-shaped media on said support structure by means of said protrusion prior to application of said seal.

27. The method of claim 26, wherein said seal can be broken to access said disc-shaped media within said upper chamber, further including the step of removing and then reinserting said disc-shaped media.

* * * * *